(12) United States Patent
Kirchner et al.

(10) Patent No.: US 10,924,015 B2
(45) Date of Patent: *Feb. 16, 2021

(54) METHODS, APPARATUS, AND SYSTEMS FOR CURRENT SENSING IN VALLEY CURRENT-CONTROLLED BOOST CONVERTERS

(71) Applicant: Texas Instruments Incorporated, Dallas, TX (US)

(72) Inventors: Joerg Kirchner, Mauern (DE); Stefan Dietrich, Freising (DE); Ivan Shumkov, Freising (DE); Christian Harder, Freising (DE)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/990,382

(22) Filed: May 25, 2018

(65) Prior Publication Data

US 2019/0363625 A1 Nov. 28, 2019

(51) Int. Cl.
*H02M 3/158* (2006.01)
*H02M 1/00* (2006.01)

(52) U.S. Cl.
CPC .... *H02M 3/158* (2013.01); *H02M 2001/0009* (2013.01)

(58) Field of Classification Search
CPC ............ H02M 3/158–1588; H02M 2001/0009
See application file for complete search history.

(56) References Cited

U.S. PATENT DOCUMENTS

| 4,970,415 | A | * | 11/1990 | Fitzpatrick | G05F 3/245 323/313 |
|---|---|---|---|---|---|
| 5,113,089 | A | | 5/1992 | Osawa | |
| 9,812,963 | B1 | * | 11/2017 | Nguyen | H02M 3/1588 |
| 2006/0261786 | A1 | | 11/2006 | Tiew et al. | |
| 2012/0286684 | A1 | * | 11/2012 | Melanson | H02M 1/4225 315/224 |
| 2013/0169248 | A1 | * | 7/2013 | Zhang | H02M 3/158 323/271 |
| 2013/0265093 | A1 | * | 10/2013 | Zhang | H03K 3/0231 327/299 |
| 2016/0322965 | A1 | * | 11/2016 | Elran | H03K 17/687 |
| 2017/0257031 | A1 | | 9/2017 | Shao et al. | |
| 2017/0346400 | A1 | * | 11/2017 | Li | H02M 3/1582 |

OTHER PUBLICATIONS

Search Report for PCT Application No. PCT/US19/33775, dated Sep. 5, 2019, 1 page.

* cited by examiner

*Primary Examiner* — Peter M Novak
(74) *Attorney, Agent, or Firm* — Michael A. Davis, Jr.; Charles A. Brill; Frank D. Cimino (57) ABSTRACT

Methods, systems, and apparatus to facilitate current sensing for valley current-controlled power converters are disclosed. An example apparatus includes a comparator including a first terminal, a second terminal, and an output. The apparatus further includes a first transistor including a first drain coupled to the first terminal of the comparator. The apparatus further includes a second transistor including a second drain coupled to the first terminal of the comparator. The apparatus further includes a third transistor including a third drain coupled to the second terminal of the comparator.

4 Claims, 5 Drawing Sheets

METHODS, APPARATUS, AND SYSTEMS FOR CURRENT SENSING IN VALLEY CURRENT-CONTROLLED BOOST CONVERTERS

FIELD OF THE DISCLOSURE

This disclosure relates generally to power converters and, more particularly, to methods, apparatus, and systems to facilitate current sensing for valley current-controlled power converters.

BACKGROUND

A power converter is a circuit that is used in various electrical components to convert an input voltage to a desired output voltage. For example, a boost converter converts an input voltage into a high output voltage by controlling transistors and/or switches to charge and/or discharge inductors and/or capacitors to maintain the desired output voltage. Some boost converters are valley-current-controlled. Such boost converters use the detection of valley currents (e.g., a minimum threshold current) to trigger the charging/discharging of the inductor/capacitor.

SUMMARY

Certain examples disclosed herein facilitate current sensing for valley current-controlled power converters in down-mode operation. An example apparatus includes a comparator including a first terminal, a second terminal, and an output. The apparatus further includes a first transistor including a first drain coupled to the first terminal of the comparator. The apparatus further includes a second transistor including a second drain coupled to the first terminal of the comparator. The apparatus further includes a third transistor including a third drain coupled to the second terminal of the comparator.

Certain examples disclosed herein facilitate current sensing for valley current-controlled power converters in down-mode operation. An example apparatus includes a first transistor to provide current from an inductor of a boost converter to a first node. The example apparatus further includes a second transistor to, when an inductor current is within a threshold value from zero, linearize a first voltage at the first node toward a second voltage of a second node. The example apparatus further includes a third transistor to couple an output voltage node of the boost converter to the second node. The example apparatus further includes a comparator to, when the first voltage is below the second voltage, output a trigger signal, the trigger signal to enable low-side control of the boost converter.

Certain examples disclosed herein facilitate current sensing for valley current-controlled power converters in down-mode operation. An example system includes a boost converter to operate in a first mode and a second mode, the boost converter including an inductor, a high-side switch, and a low-side switch. The example system further includes a controller to control the high-side switch and the low-side switch based on a trigger signal. The example system further includes a current sensing system to generate the trigger signal when the inductor current reaches a first threshold value. The current sensing system of the example system including a first transistor to provide current from an inductor of a boost converter to a first node; a second transistor to, when an inductor current is within a second threshold value from zero, linearize a first voltage at the first node toward a second voltage of a second node, the second node corresponding to an output voltage of the boost converter; and a comparator to output the trigger signal based on a comparison of the first voltage and the second voltage.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

A boost converter is a circuit including an inductor, a capacitor, and switches (e.g., diodes, metal oxide semiconductor field effect transistors (MOSFETs), etc.) to generate a desired output voltage. For example, a controller may enable a low-side switch to short the inductor to ground, thereby causing current to flow through the inductor, which stores energy in its magnetic field. At the same time, there is no, or a substantially small amount, of current flowing through a high-side switch and the capacitor. Once the inductor is sufficiently charged, the controller may disable the low-side switch and enable the high-side switch to produce a back electromotive force (e.m.f.) in the opposite polarity to the voltage across the inductor to keep current flowing toward the capacitor and load, thereby charging the capacitor. In this manner, when the controller enables the low-side switch to subsequently charge the inductor, the capacitor can discharge to maintain the output voltage. The controller can toggle between high-side control and low-side control to ensure that the input voltage converts to a desired output voltage.

Some boost converts that operate at large duty cycles can support two operation modes. The first mode is a standard boost-mode operation, where Vout is greater than Vin (e.g., as described above). Some boost converts toggle between high-side and/or low-side control based on a valley current of the boost converter (e.g., the minimum threshold inductor current). Such boost converters sense the high-side-transistor current and compare the sensed current to a reference valley current (e.g., a minimum threshold current). When the sensed valley current hits the reference, the high-side transistor is turned off (e.g., disabled) and the low-side transistor is turned on (e.g., enabled). In some examples, the low-side transistor remains enabled until a clock or timer triggers the controller to turn off the low-side transistor and turn on the high-side transistor for a subsequent period. In the standard boost-mode operation, the two transistors operate in the linear mode when turned on (e.g., the MOSFETs act as switches).

The second mode is a down-mode, where Vout is less than Vin. The second mode may be activated during start-up or in steady-state applications. In down-mode, the high-side transistor cannot operate in linear mode when turned on (e.g., enabled). Because Vout is less than Vin, the voltage across the inductor in the discharge phase (e.g., when the high-side MOSFET is on) will still be positive and the inductor current will continue to increase. Some conventional boost converters include a p-channel MOSFET (PMOS transistor) with a gate connected to Vin and a body contact (e.g., bulk contact, back gate contact, substrate contact, etc.) to disconnect the body of the high-side from Vout, as further described below in conjunction with FIG. 2. When the body is disconnected from Vout and the gate is connected to Vin, the high-side transistor acts as a passive diode rather than a switch. However, because such conventional boost converters require extremely small duty cycles, valley-current control with current sensing in the high-side path may be used to control boost converters. Examples disclosed herein provides accurate current sensing in down mode operation and transitions to down-mode in a boost converter.

Conventional current sensing techniques utilize two replica transistors for a high-side switch. In such conventional techniques, when current flows across the high-side MOSFET, the current generates a voltage drop proportional to its drain-source resistance (RDS). Accordingly, by connecting a first replica switch to the source of the high-side MOSFET and a comparator (e.g., used to identify the valley current based on a comparison of two node voltages), the voltage drop across the replica transistor matches the voltage drop of the high-side MOSFET by a replica factor. Once the positive input of a comparator drops below the output voltage (e.g., when a switching current has dropped below the required valley current), a comparator outputs a trigger signal to disable the high-side MOSFET and enable the low-side MOSFET. The second replica MOSFET is added to generate an offset voltage, thereby enabling the sensing of negative valley currents. When the MOSFETs operate in the linear region, such conventional techniques work fine. However, when the boost converter enters down-mode operation, the high-side switch operates in diode mode and the low-side switch still operates in the linear mode. Because the gate of the high-side transistor is connected to Vin, the transistor then behaves as a passive diode and is not actively turned "on" and "off" any more. This diode mode behavior of the high-side together with the valley-current-control across this diode is rather inaccurate. Due to the characteristic current vs. voltage behavior of the diode, the positive input of the comparator will become high-impedant for valley-currents close to zero, because the diode enters its process- and temperature-dependent non-linear region. Thus, the voltage slope of this node is no longer controlled accurately and the valley current level is only inaccurately controlled. Additionally, when such a boost converter changes from boost-mode to down-mode operation, a relatively large step in the valley current sensing will result in a step response of the output voltage. Additionally, the falling slope at the positive input of the comparator will change with the two modes. During the control loop, the slope forms the modulator gain. Changing the modulator gain may cause different loop gain, bandwidth, and system behavior, which leads to instability. Additionally, down-mode discontinuous conduction mode (DCM) operation is not possible due to the lack of inductor current control.

Figure 1:
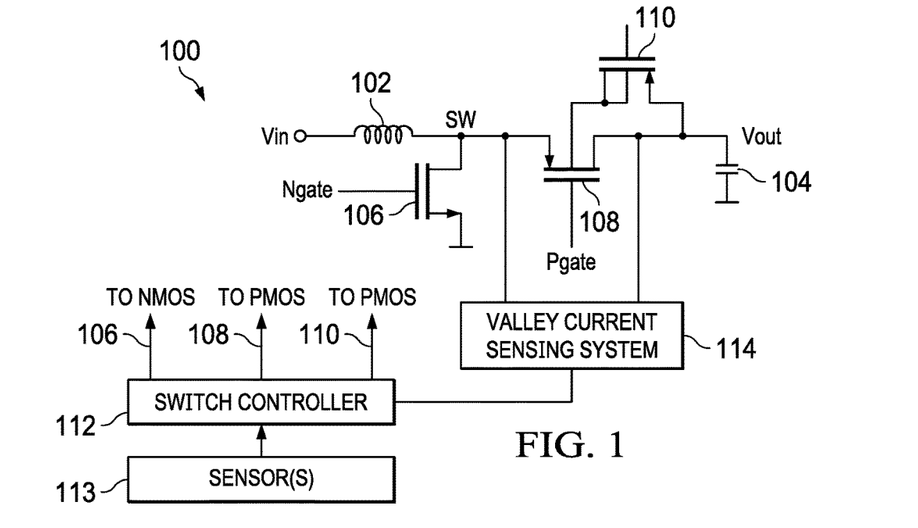
FIG. 1 is an example boost converter system.

FIG. 1 is an example boost converter system 100. The example boost converter system 100 includes an example inductor 102, an example capacitor 104, an example low-side n-channel MOSFET (NMOS) 106, an example high-side p-channel MOSFET (PMOS) 108, an example PMOS transistor 110, and an example switch controller 112. As described above, the example switch controller 112 enables and disables the example NMOS transistor 106 and the example PMOS transistor 108 in an anti-phase manner to toggle between high-side control and low-side control of the example boost converter system 100. The example inductor 102, the example capacitor 104, the example NMOS transistor 106, and the example PMOS transistor 108 make up the boost converter of the example boost converter system 100.

The example inductor 102 of FIG. 1 stores energy in its magnetic field when the example inductor 102 is shorted to ground. For example, the inductor 102 stores energy when the example switch controller 112 transmits signals to the gates of the example transistors 106, 108 to enable the example NMOS transistor 106 and disable the example PMOS transistor 108, thereby shorting the example inductor 102 to ground. When the example switch controller 112 disables the example NMOS transistor 106 and enables the example PMOS transistor 108, there is a sudden drop in current causing the example inductor 102 to produce a back e.m.f. having the opposite polarity to the voltage across the inductor 102 while the inductor 102 was shorted to ground. The back e.m.f. causes the inductor to keep current flowing in the same direction it was formerly flowing. Thus, the inductor acts as an energy source. In this manner, Vin and the back e.m.f. (e.g., in series) are used to charge the example capacitor 104. When the example switch controller 112 returns to low-side control (e.g., by enabling the example NMOS transistor 106 and disabling the example PMOS transistor 108), the example capacitor 104 discharges to supply energy to the output load, while the example inductor 102 stores additional charge for a subsequent toggle. In this manner, the example switch controller 112 can toggle between high-side control and low-side control at a particular pulse width modulation and/or frequency to ensure that the Vout matches a desired Vout based on a trigger and/or feedback loop.

The example PMOS transistor 110 of FIG. 1 is enabled (e.g., conducting) during boost-mode to connect the body of the example PMOS transistor 108 connecting (e.g., low-impedant) to Vout. During down-mode, the example PMOS transistor 110 is disabled (e.g., not conducting), thereby disconnecting the body (e.g., high-impedant) of the high-side from Vout. In this manner, when the body is disconnected from Vout and the gate of the example PMOS transistor 108 is coupled to Vin (e.g., via a switch), the body is not at the highest potential, because disabling the NMOS transistor 106 will lead to the SW node to be equal to Vin which is larger than Vout. Thus, the example PMOS transistor 108 will not behave as a diode. Instead, a high-impedant body of the example PMOS transistor 108 floats above Vin in down-mode due to capacitive coupling from the SW node. In some examples, the PMOS transistor 110 may be removed.

The example switch controller 112 of FIG. 1 controls the one or more signals used to control the example transistors 106, 108, 110 to enable high-side control (e.g., by enabling the example PMOS transistor 108 and disabling the example NMOS transistor 106) and low-side control (e.g., be disabling the example PMOS transistor 108 and enabling the example NMOS transistor 106). For example, the switch controller 112 of FIG. 1 may trigger low-side control when the high-side current (e.g., the current through the example PMOS transistor 108) reaches a valley current (e.g., as determined by the example valley current sensing system 114) and trigger high-side control based on a clock or timer. Additionally, the example switch controller 112 adjusts operation of the example boost converter system 100 between boost-mode and down-mode based on a comparison of the input voltage to the output voltage. The example switch controller 112 operates in boost-mode when the input voltage is lower than the output voltage and operates in down-mode when the input voltage is higher than the output voltage. For example, the switch controller 112 receives the input voltage and output voltage via the one or more example sensors 113. In this manner, the example switch controller 112 can transition from boost mode to down mode based on a comparison of the input voltage and the output voltage.

During down mode, the example switch controller 112 of FIG. 1 outputs a high voltage (e.g. the input voltage Vin) to the gate of the example PMOS transistor 108, thereby disabling the example PMOS transistor 108 with the fixed gate potential connected to Vin. In such a configuration, the example switch controller 112 operates the NMOS transistor 106 in the same, or a substantially similar, manner as the boost mode, thereby connecting one terminal of the inductor 102 to ground to increase the inductor current, when enabled. To discharge the inductor 102, the NMOS transistor 116 is turned "off". The back e.m.f. causes the inductor to keep current flowing in the same direction that the current was formerly flowing. With the NMOS transistor 106 turned "off" (e.g., disabled) and the gate of the PMOS transistor 108 connected to Vin, the SW node is high impedant. Thus, the back e.m.f. generates enough potential voltage to forward bias the body diode of the PMOS transistor 108 (e.g., the potential voltage more than the threshold voltage of the example PMOS 108) is and to charge the capacitor 104. The back e.m.f. hence creates a voltage having the opposite polarity to the voltage across the inductor 102 while the inductor 102 was shorted to ground, thereby causing the inductor to discharge. The threshold voltage of the PMOS transistor 108 is output current-dependent, temperature-dependent, and/or process-dependent. In some examples, the transition from boost to down mode may be done from cycle to cycle.

For applications that require small duty cycles, the example valley current sensing system 114 of FIG. 1 may be used for current sensing at the PMOS transistor 108, as further described below in conjunction with FIG. 2. The example valley current sensing system 114 triggers a signal when the high-side current (e.g., the current through the example PMOS transistor 108 from the example inductor 102) reaches a valley. The trigger signal (e.g., a high voltage pulse and/or a rising edge of a voltage pulse) is transmitted to the example switch controller 112 to trigger a turn off of high-side control and a turn on of low-side control (e.g., by disabling the example PMOS transistor 108 and enabling the example NMOS transistor 106). The example switch controller 112 returns back to high-side control based on clock and/or timer (e.g., after a threshold duration of time). Additionally, the example valley current sensing system 114 may output a current corresponding to the high-side current to a regulation loop. The regulation loop may amplify the valley current so that when the Vout drops, the regulation loop can increase the amount of current in the inductor 102 to regulate for load steps and/or ramp currents for slope compensation. An example conventional current sensing system is further described below in conjunction with FIG. 2 and an example current sensing system improvement is further described below in conjunction with FIG. 3.

Figure 2:
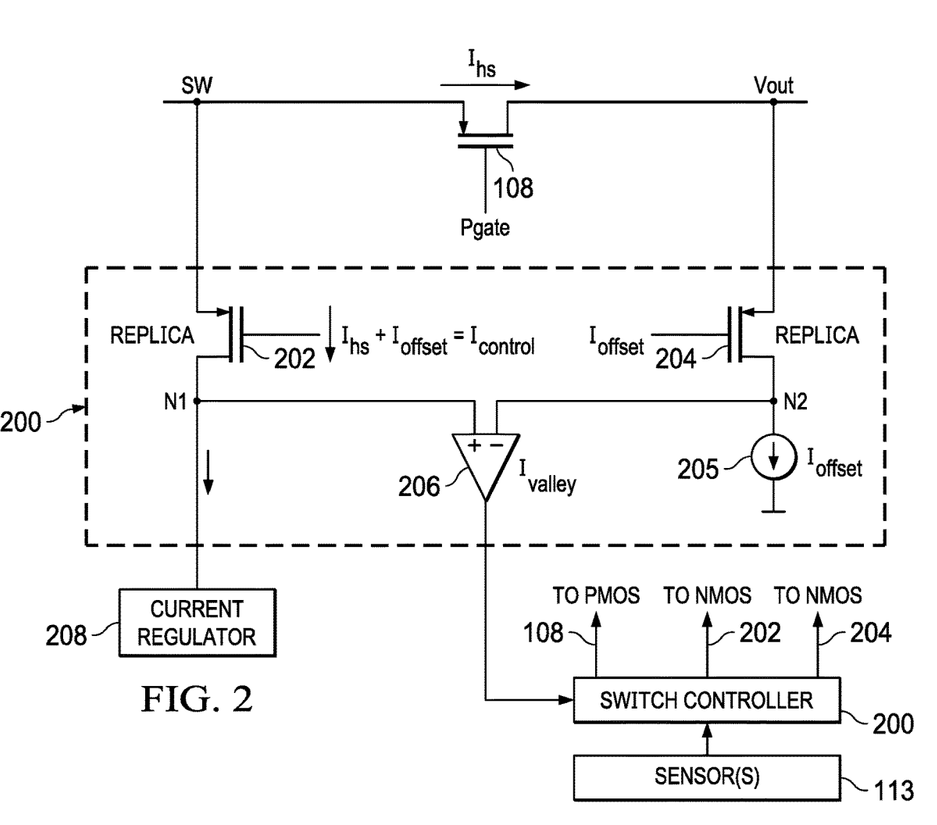
FIG. 2 is the example boost converter system of FIG. 1 with conventional current sensing for valley-current control.

FIG. 2 illustrates a circuit implementation of an example conventional valley current sensing system 200 that may be used to facilitate valley-current control of a boost converter (e.g., the example boost converter system 100 of FIG. 1). FIG. 2 includes the example high-side PMOS transistor 108 of FIG. 1. The example conventional valley current sensing system 200 includes example replica PMOS transistors 202, 204, and an example comparator 206. FIG. 2 further depicts an example switch controller 200 and an example current regulator 208 working in conjunction with the example conventional valley current sensing system 200.

The example replica PMOS transistors 202, 204 of FIG. 2 have the same, or substantially similar properties to (e.g., replicate) the example high-side PMOS transistor 108. The source of first example replica PMOS transistor 202 is coupled to the source of the example PMOS transistor 108 (e.g., via node SW) and the drain of the first example replica PMOS transistor 202 is coupled to the positive terminal of the example comparator 206 and the example current regulator 208 (e.g., via node N1). The source of the example replica PMOS transistor 204 is coupled to the drain of the example PMOS transistor 108 (e.g., via the Vout node) and the drain of the example PMOS transistor 204 is coupled to the negative terminal of the example comparator 206 (e.g., via node N2). The example current source 205 is representative of an offset current that is drawn across the example PMOS transistor 204 to create the voltage drop across the example replica PMOS transistor 204. Additionally, the example replica PMOS transistor 204 generates an offset voltage so that the example comparator 206 is able to sense negative valley currents.

The example comparator 206 of FIG. 2 is an inverting comparator that compares the voltage at the N1 node (e.g., the voltage at the drain of the example PMOS transistor 202 corresponding to the voltage at the SW node) with the voltage at the N2 node (e.g., the voltage at the drain of the example PMOS transistor 204 corresponding to the voltage at the Vout node). When the voltage at the N1 node is higher than the voltage at the N2 node, the example comparator 206 outputs a first voltage (e.g., 5V, logic value '1', etc.) and when the voltage at the N1 node is lower than the voltage at the N2 node, the example comparator 206 outputs a second voltage (e.g., 0V, logic value '0', etc.). In some examples, the comparator 206 may be a non-inverting comparator. As described above, the output of the high voltage of the comparator 206 triggers the example switch controller 200 to adjust from high-side control to low-side control.

The example current regulator 208 of FIG. 2 provides a regulation loop. For example, the current regulator 208 represents the output of the outer voltage feed-back loop. Vout is compared to a desired reference voltage (Vref) (e.g., from a bandgap, etc.) (e.g., using the example sensors 113 or another voltage sensing device). When Vout falls below Vref, the output of an error amplifier of the current regulator 208 goes high. The output voltage of the error amplifier is converted into a current, represented by the example current regulator 208. For example, the higher the error amplifier output, the more current at the example current regulator 208, thereby causing a higher valley-current level to supply the output capacitor 104 during a subsequent period. Lower error amplifier output (e.g., when Vout is greater than Vref)

results in less current at the example current regulator 208, thereby causing a lower valley-current level. Slope compensation is a fixed value that supports the current regulation to avoid instability.

When the boost converter is operating in boost-mode, the control current through the example replica PMOS transistor 202 is equal to the high-side current (e.g., the current through the high-side PMOS transistor 108) plus the offset current. Because the example PMOS transistor 202 is a replica of the example PMOS transistor 108, the voltage at the node N1 is substantially similar to the voltage drop across the example high-side PMOS transistor 108 (e.g., the high-side current (Ihs) times the drain to source resistance of the high-side PMOS transistor 108 (Rhs)). Accordingly, the voltage at node N1 is substantially similar to the product of the drain to source resistance of the replica PMOS transistor 202 (Rrepl) and the difference between the control current (Icontrol) and the offset current (Ioffset) (e.g., (Icontrol−Ioffset)·Rrepl). When the boost converter is operating in down-mode, the example high-side transistor PMOS transistor 108 operates in diode mode. Accordingly, the voltage at the SW node only increases non-linearly for load currents. Additionally, in down-mode, because the example PMOS transistor 108 operates as a diode, the example PMOS transistor 108 only allows currents in one direction from the SW node to the Vout node. Accordingly, negative currents are no longer possible, as they are in boost-mode.

During down-mode, the example replica PMOS transistor 202 of FIG. 2 is set to diode operation. The example replica PMOS transistor 202 operates in diode mode because the gate of the example PMOS transistor 202 is connected to Vin. Thus, the SW node potential is Vin plus a threshold. In this manner, the threshold voltage of the example PMOS transistor 108 from the SW node to the Vout node and the threshold voltage of the example PMOS transistor 202 from the SW node to the N1 node is cancelled. The example second replica PMOS transistor 204 is still in linear mode due to the cancellation (e.g., the voltages at N1 and N2 are still at the same potential to offer current regulation with the example comparator 206). As described above, because the example PMOS transistor 202 is set to diode mode, the high voltage at the SW node is cancelled, thereby causing the voltages at N1 and N2 to be the same. Accordingly, the control current is substantially similar to the high-side current and the voltage at the N1 node is substantially similar to the product of the control current and the resistance of the example replica PMOS transistor 202. When the valley currents are close to zero, the control current has to be close to zero also. This forms a high-impedance node at the positive input of the example comparator 206. Accordingly, the slope of the voltage at the N1 node becomes non-linear and can no longer be controlled accurately and the valley current level can only be inaccurately controlled. When the boost converter changes from boost-mode to down-mode, an inaccurate current sensing may cause a large step in the valley current sensing, resulting in an undesired step response to the output voltage. Additionally, the magnitude of the sensing of a falling slope at a positive input of the example comparator 206 will change a lot with the two operation modes. As described above, the slope is used by the example regulator 208 to form the modulator gain. Accordingly, changing the gain will cause different loop gain, bandwidth, and system behavior that could cause instability.

Figure 3:
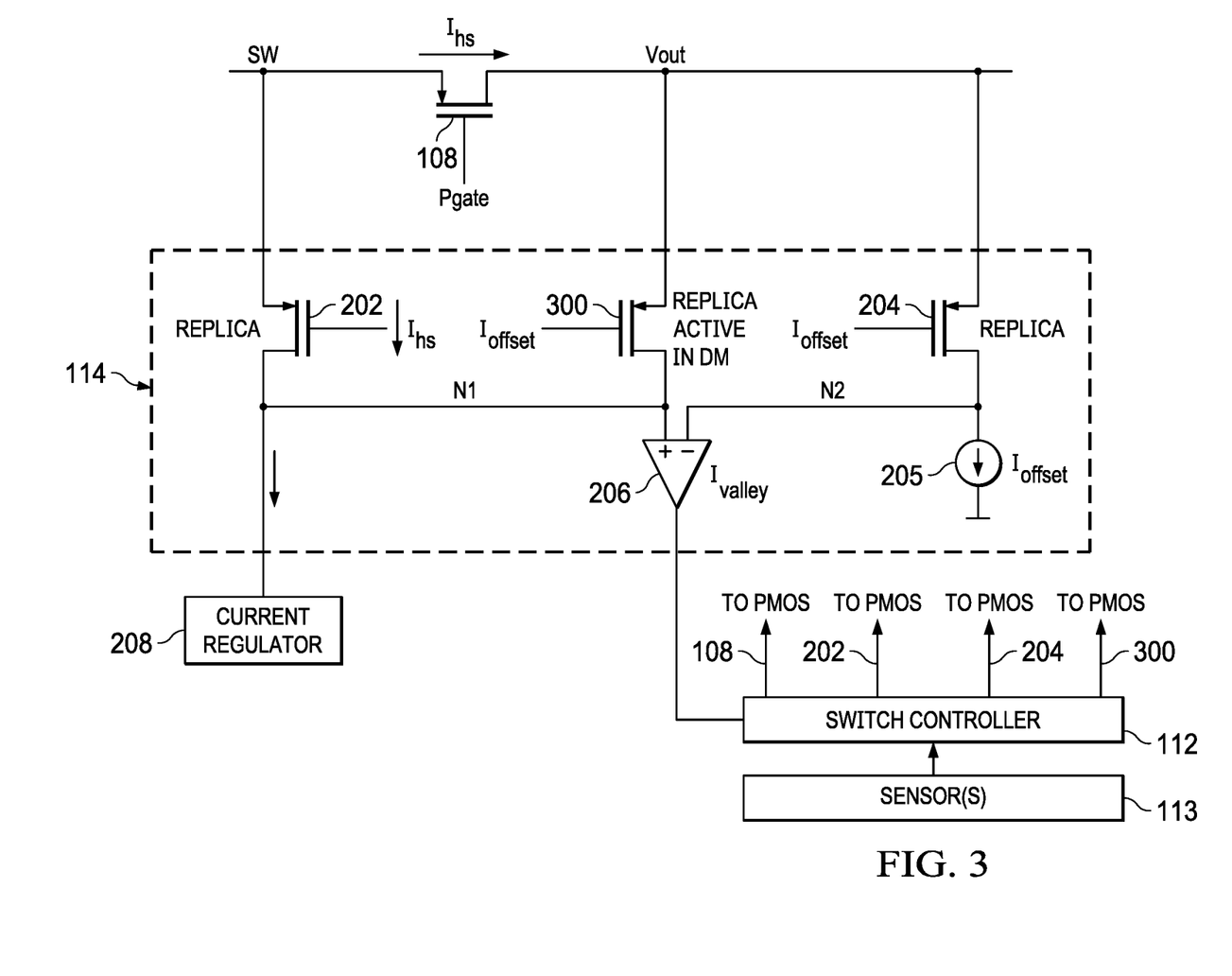
FIG. 3 is an example boost converter system to facilitate current sensing for valley current-controlled power converters in down-mode operation.

FIG. 3 is a circuit implementation of the example valley current sensing system 114 of FIG. 1 that may be used to facilitate current sensing for valley current-controlled power converters in down-mode operation (e.g., such as the example boost converter system 100 of FIG. 1). The example valley current sensing system 114 includes the example replica PMOS transistors 202, 204, the example current source 205, the example comparator 206, and the example current regulator 208 of FIG. 2 and an example replica PMOS transistor 300. FIG. 3 further includes the example high-side PMOS transistor 108 and the example switch controller 112 of FIG. 1.

The example replica PMOS transistor 300 of FIG. 3 is implemented to sense the valley current in both operating modes without changing the control current, thereby providing a seamless transition between the two operating modes. The example replica PMOS transistor 300 has the same, or substantially similar properties to (e.g., replicate) the example high-side PMOS transistor 108. The source of the example PMOS transistor 300 is coupled to the Vout node and the drain is coupled to the N1 node. The example replica PMOS transistor 300 is enabled during down-mode and disabled during boost-mode. By adding the example PMOS transistor 300, it is possible for the example comparator 206 to sense valley current (e.g., based on a comparison of voltages at the nodes N1 and N2) in both boost-mode and down-mode without changing the control current (e.g., the example comparator 206 senses the valley current at the same level as in boost-mode operation), thereby providing a seamless transition between the two modes.

During down-mode operation, the example PMOS transistors 300, 204 of FIG. 3 operate in linear mode. Additionally, the example PMOS transistors 108, 202 operate in diode-mode, thereby conducting current in one direction. Accordingly, the example replica PMOS transistor 202 acts like a current source to inject current to the node N1. Because the example replica PMOS transistor 300 is operating in linear mode, the example replica PMOS transistor 300 linearizes the voltage at node N1, thereby reducing the impedance of the positive terminal of the example comparator 206 and generating a controlled slope at node N1. In this manner, the example comparator 206 can more accurately determine the valley current for a more accurate boost converter control. Additionally, by linearizing the voltage at the node N1, the example PMOS transistor 300 generates the same offset voltage as the example PMOS transistor 204. Accordingly, the example PMOS transistor 300 ensures that the system modulator gain is constant.

As described above, in conjunction with FIG. 2, the example current regulator 208 may provide slope compensation to achieve converter stability. Accordingly, the node N1 combines the high-side current and the slope compensation from the example current regulator 208. When the inductor current is much greater than zero, the linearized node N1 operates similar to the system of FIG. 2. However, when the current gets close to zero, the non-linearized system of FIG. 2 faces accuracy issues and cannot regulate on the low inductor current. Because the example PMOS transistor 300 linearizes the voltage at the N1 node, N1 stays low-impedance and, when the inductor current becomes zero, the slope compensation of the example current regulator 208 further regulates the voltage at the node N1 linearly to the voltage at the node N2. In this manner, the off state of both of the example PMOS transistors 108, 202 can be controlled (e.g., for DCM mode). Accordingly, the linearization of the N1 node supports DCM operation. For DCM operation, an off-time is necessary which determines the high-impedance state of the boost converter. Because, the linearization of the N1 node decreases the impedance of the positive terminal of the comparator 206, DCM operation is possible with an additional slope compensation current ramp drawn from the example current regulator 208.

Figure 4:
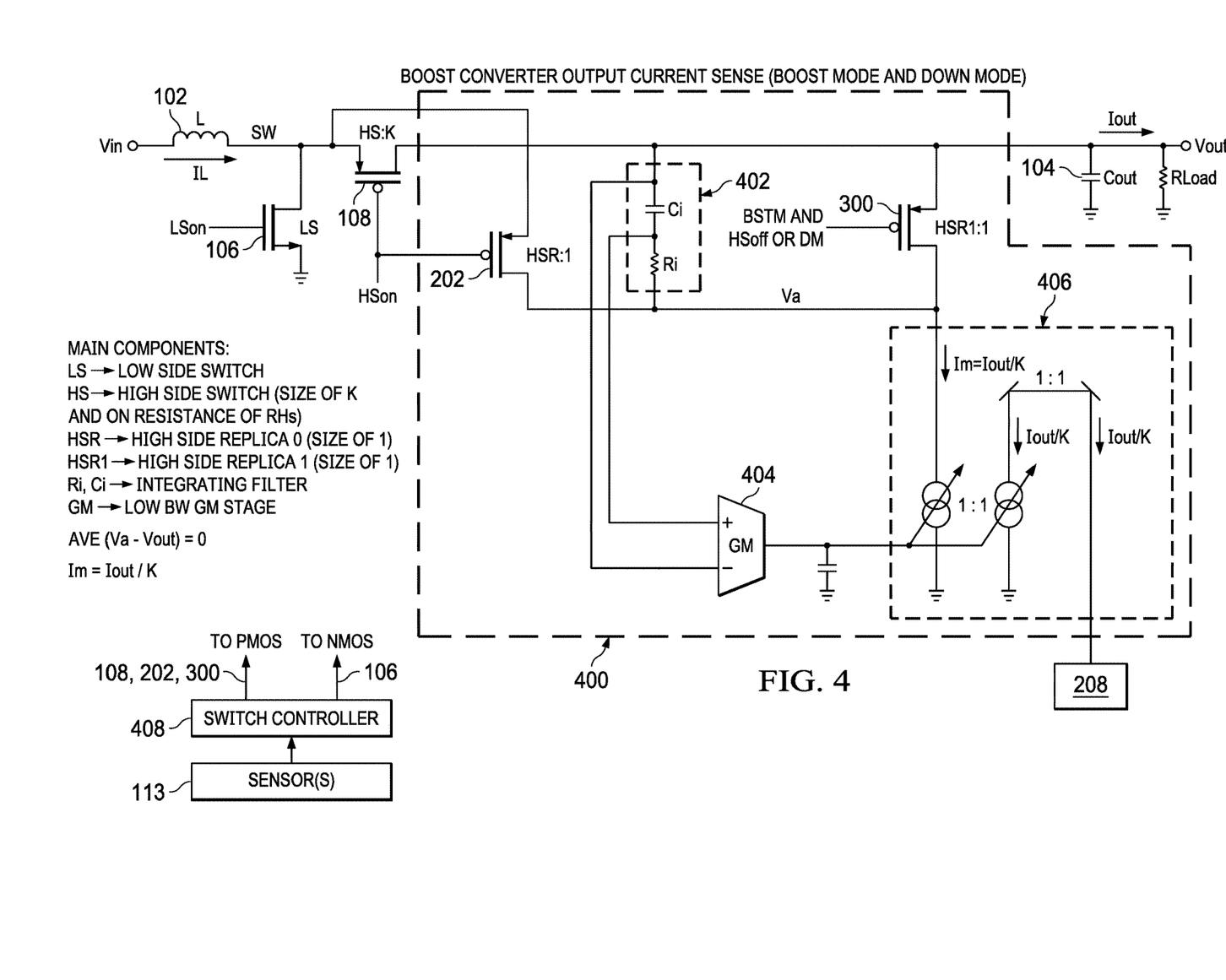
FIG. 4 is an example current sensing system to provide an accurate sensing of the average boost converter output current for both boost-mode and down-mode.

FIG. 4 is an example current sensing system 400 to provide an accurate sensing of the average boost converter output current for both boost-mode and down-mode using examples disclosed herein. FIG. 4 includes the example inductor 102, the example capacitor 104, and the example MOSFETs 106, 108, an example switch controller 408, and the example sensor(s) 113 of FIG. 1. The example current sensing system 400 includes the example replica PMOS transistor 202, and the example replica PMOS transistor 300 of FIG. 3 and an example integrating filter 402, an example comparator 404, and an example current mirror 406.

In the example current sensing system 400 of FIG. 4, the example replica PMOS transistor 300 provides a linearized replica structure similar to the example of FIG. 3. Such a structure gets rid of the non-linearized current behavior of the example high-side PMOS transistor 108 when the inductor current approaches zero. In the example current sensing system 400, the source of the example replica PMOS transistor 202 is coupled to the source of the example high-side PMOS transistor 108 and the drain of the example replica PMOS transistor 202 is coupled to the node Va (e.g., similar to the node N1 of FIG. 3). Additionally, the source of the example replica PMOS transistor 300 is coupled to the node Vout and the drain of the replica PMOS transistor 300 is coupled to the node Va. The example Va node is coupled to the Vout node via the example integrating filter 402. The example integrating filter 402 averages the output current over X number of switching cycles (e.g., X may be based on user and/or manufacture preferences). The example comparator (e.g., an error amplifier) 404 compares the voltage at the node Vout with a voltage corresponding to the average output current over the X number of switching cycles. In this manner, the example error amplifier 404 regulates the control current (Im) of the example current sensing system 400. In the example of FIG. 4, the control current corresponds to the output current divided by k, the gate length size of the high-side PMOS transistor 108. The control current is mirrored by the example current mirror 406 and provided to the example current regulator 208. The example current regulator 208 uses the mirrored control current to determine output current information, which is averaged over switching cycles. Because the current derived from the example integrating filter 402 is directly proportional to the output current, additional post-processing with the duty cycle is not needed. Additionally, the example current sensing system 400 does not require a zero-current detection comparator when it is in down-mode DCM to operate properly (e.g., because during down-mode, the example PMOS transistor 108 works as a diode to avoid negative currents), thereby reducing the complexity of the current sensing used for boost converters.

Figure 5:
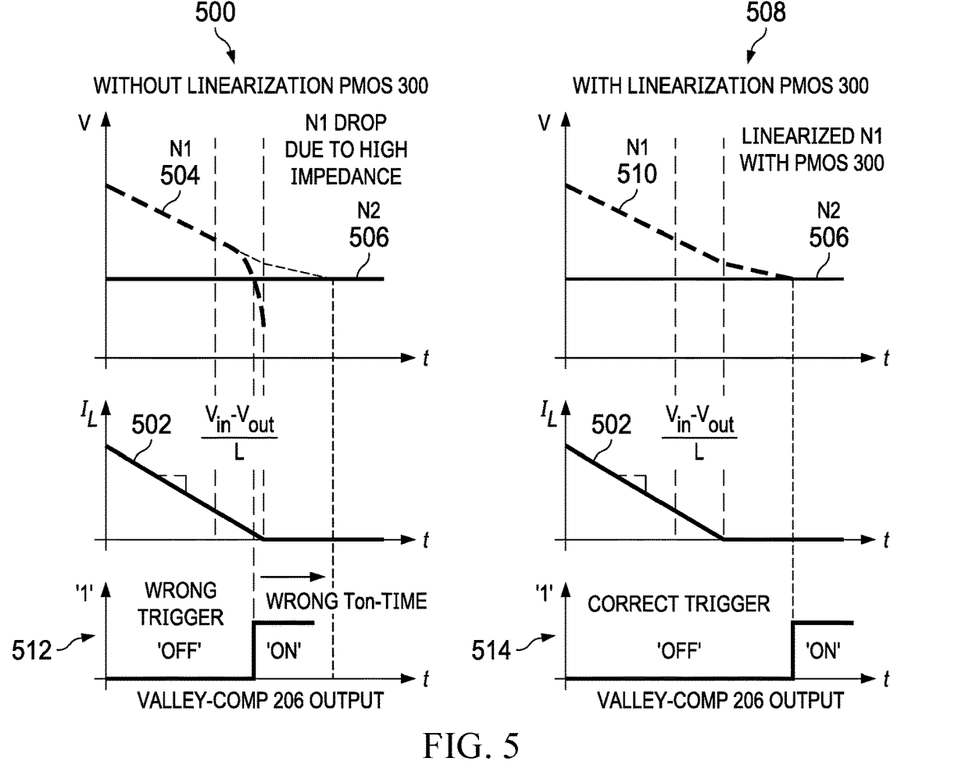
FIG. 5 illustrates a comparison between valley current sensing using the conventional current sensing of FIG. 2 and the current sensing of FIG. 3.

FIG. 5 illustrates a comparison between a first example diagram 500 of a valley current sensing using the conventional current sensing of FIG. 2 with a second example diagram 508 of valley current sensing using the current sensing of FIG. 3. The first example diagram 500 includes an example inductor current 502, an example conventional N1 voltage 504, and an example N2 voltage 506, and an example comparator output signal 512 based on non-linearization of the N1 node. The second example diagram 508 includes, the example inductor current 502, the example N2 voltage 506, an example N1 voltage 510, and an example comparator output signal 514 based on linearization of the N1 node.

The first example timing diagram 500 of FIG. 5 illustrates the non-linearity of the example conventional N1 voltage 504 as the example inductor current 502 approaches zero. The example N2 voltage 506 corresponds to the output voltage of the boost converter that is used to identify the reference valley current (e.g., when the example conventional N1 voltage 504 reaches the example N2 voltage 506) to adjust from high-side control to low-side control of the boost converter. As described above, when the boost converter changes from boost-mode to down-mode, a relatively large step in the valley current sensing occurs, resulting in a step response of the output voltage. Additionally, sensing based on the falling slope of the example conventional N1 voltage 504 at the positive input of the comparator 206 will change significantly with the two operation modes. For the control loop, the slope forms the modulator gain. Accordingly, the changing of the gain will cause different loop gain, bandwidth, and system behavior, which could lead to instability. Additionally, without the linearization of the example N1 voltage 504, down-mode DCM is not possible due to the lack of accurate control close to zero load current. Because the current ripple of a boost converter in down-mode is typically very large, the converter enters DCM in down-mode already at medium loads, which are still continuous conduction mode (CCM) in conventional boost-mode.

The second example timing diagram 508 of FIG. 5 illustrates the linearity of the example N1 voltage 510. As shown in the timing diagram 508, the example N1 voltage 510 is linearized while the inductor current 502 approaches zero. As described above, when the inductor current 502 is much greater than zero, the example N1 voltage 510 is similar to the linear portion of the example conventional N1 voltage 504. However, when the example inductor current 502 is close to zero (e.g., is within a threshold range of zero, the threshold being based on the characteristics of one or more components of the example boost converter system 100), the example N1 voltage 510 is linearized while the example conventional N1 voltage 504 drops in a non-linear manner. Accordingly, N1 stays low-impedance and as soon as the inductor current 502 becomes zero, the slope compensation of the example current regulator 208 further regulates the N1 voltage 504 linearly to N2. In this manner, the off state of both transistors 108, 106 is controlled and DCM is possible during the illustrated extended range. For example, using without linearization, the example comparator output signal 512 goes high (e.g., turns on) when the inductor current 502 reaches zero. However, with linearization, the example comparator output signal 512 goes high when the example N1 voltage 510 reaches the example N2 voltage 506 (e.g., some time after the example inductor current 502 reaches zero), thereby allowing DCM.

While an example manner of implementing the example switch controller 112 of FIG. 1 is illustrated in FIGS. 1, 3, and 4, one or more of the elements, processes and/or devices illustrated in FIGS. 1, 3, and 4 may be combined, divided, re-arranged, omitted, eliminated and/or implemented in any other way. Further, the example switch controller 112, 408 of FIGS. 1, 3, and 4 may be implemented by hardware, software, firmware and/or any combination of hardware, software and/or firmware. Thus, for example, the example switch controller 112, 408 of FIGS. 1, 3, and 4 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, the example switch controller 112, 408 of FIGS. 1, 3, and 4 is/are hereby expressly defined to include a non-transitory computer readable storage device or storage disk such as a memory, a digital versatile disk (DVD), a compact disk (CD), a Blu-ray disk, etc. including the software and/or firmware. Further still, the example switch controller 112, 408 of FIGS. 1, 3, and 4 may include one or more elements, processes and/or devices in addition to, or instead of, those illustrated in FIGS. 1, 3, and 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

A flowchart representative of example hardware logic or machine readable instructions for implementing the example switch controller 112, 408 of FIG. 1 is shown in FIGS. 1, 3, and 4. The machine readable instructions may be a program or portion of a program for execution by a processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 6, many other methods of implementing the example switch controller 112, 408 of FIGS. 1, 3, and 4 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

Figure 6:
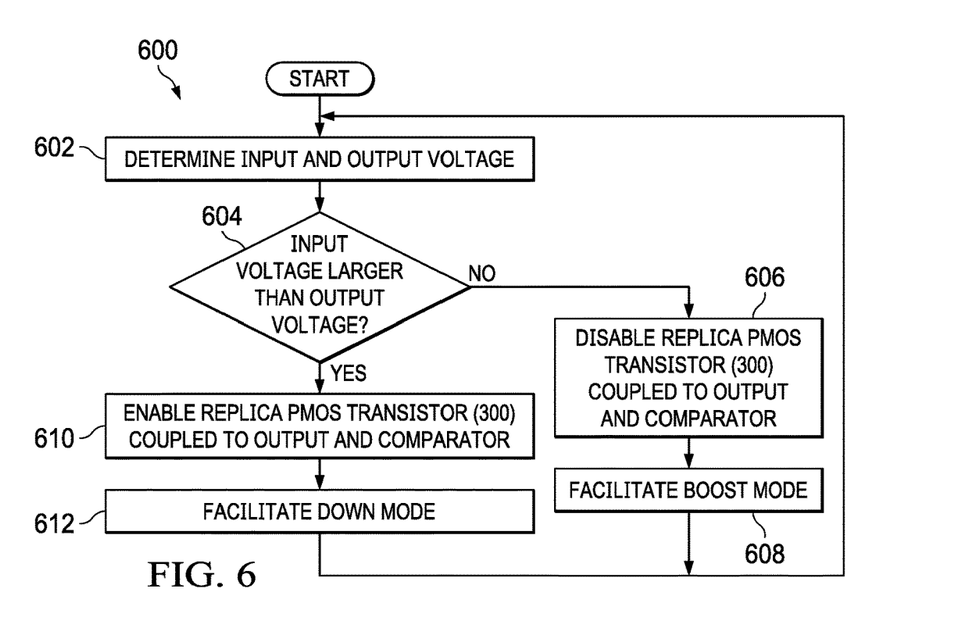
FIG. 6 is a flowchart representative of example machine readable instructions that may be executed to implement the example switch controller 112 of FIGS. 1, 3, and 4.

FIG. 6 is an example flowchart 600 representative of example machine readable instructions that may be executed by the example switch controller 112 of FIG. 1 to facilitate current sensing for valley current-controlled power converters. Although the example flowchart 600 of FIG. 6 is described in conjunction with the example switch controller 112 and the example boost converter system 100 of FIGS. 1 and 3, the flowchart 600 may be described in conjunction with any switch controller in any type of boost converter.

At block 602, the example switch controller 112 determines the input voltage and the output voltage of the example boost converter 100. The example switch controller 112 may determine the input voltage and/or the output voltage of the boost converter system 100 based on a measurement from the one or more example sensors 113. At block 604, the example switch controller 112 determines if the input voltage is larger than the output voltage. The input voltage being larger than the output voltage triggers down-mode operation while the input voltage being smaller than the output voltage triggers boost-mode operation.

If the example switch controller 112 determines that the input voltage is not larger than the output voltage (block 604: NO), the example switch controller 112 disables the example replica PMOS transistor 300 (e.g., by applying a high voltage to the gate of the example replica PMOS transistor 300) (block 606). At block 608, the example switch controller 112 facilitates boost-mode operation. The example switch controller 112 will continue to facilitate boost-mode operation until the input voltage is larger than the output voltage, thereby triggering down-mode operation. As described above, the example switch controller 112 facilitates boost-mode operation by toggling between high-side and low-side control of the example MOSFET transistors 106, 108, 202, 204, 204 (e.g., enabling high-side control by enabling the example PMOS transistors 108, 202, 204 and disabling the example NMOS transistor 106 and enabling low-side control by enabling the example NMOS transistor 106 and disabling the example PMOS transistors 108, 202, 204). For example, the switch controller 112 enables high-side control until the valley current is sensed and triggered by the output of the example comparator 206, at which point the example switch controller 112 enables low-side control. The example switch controller 112 enables low-side control until a duration of time corresponding to a clock or timer, when high-side control returns.

If the example switch controller 112 determines that the input voltage is larger than the output voltage (block 604: YES), the example switch controller 112 enables the example replica PMOS transistor 300 (e.g., by applying a low voltage to the gate of the example replica PMOS transistor 300) (block 610). At block 612, the example switch controller 112 facilitates down-mode operation. The example switch controller 112 will continue to facilitate down-mode operation until the input voltage is not larger than the output voltage, thereby triggering boost-mode operation. As described above in conjunction with FIG. 1, the example switch controller 112 facilitates down-mode operation by disabling the example PMOS transistor 108 and toggling the example NMOS transistor 106 in the same, or substantially the same manner as in boost-mode, thereby connecting one terminal of the inductor 102 to ground to increase the inductor current when the NMOS transistor 106 enabled, and discharging the example inductor 102 when the example NMOS transistor 104 is disabled.

Figure 7:
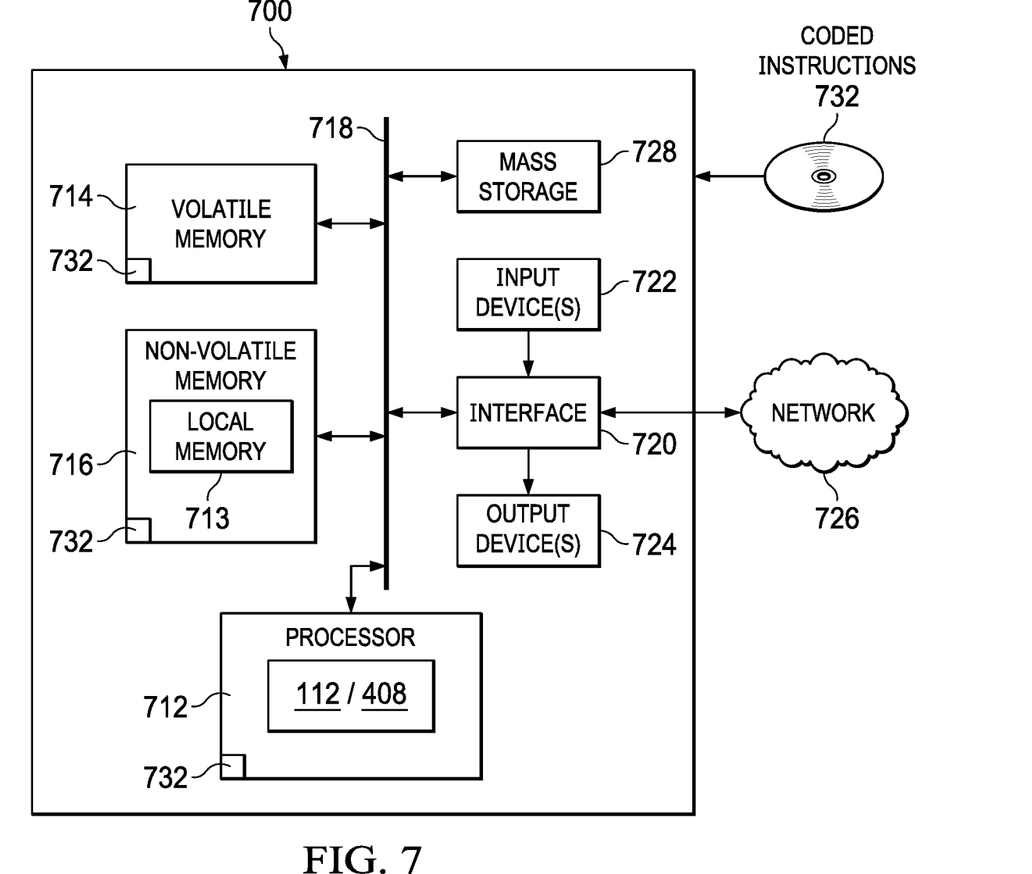
FIG. 7 is an example processor platform that may execute the example computer readable instructions of FIG. 6 to implement the components of the example switch controller of FIGS. 1, 3, and 4.

FIG. 7 is a block diagram of an example processor platform 700 structured to execute the instructions of FIG. 6 to implement switch controller 112, 408 of FIG. 1. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example switch controller 112, 408 of FIG. 1.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device (s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIG. 6 may be stored in the mass storage device 728, in the volatile memory 714, in the non-volatile memory 716, and/or on a removable non-transitory computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A system comprising:
    a boost converter configured to operate in a first mode and a second mode, the boost converter including an inductor, a high-side switch and a low-side switch;
    a controller configured to control the high-side switch and the low-side switch based on a trigger signal; and
    a current sensing system configured to provide the trigger signal responsive to a current from the inductor reaching a threshold level, the current sensing system including:
        an input terminal;
        a current terminal, the high-side switch coupled between the input terminal and the current terminal;
        a comparator having a comparator output and first and second comparator inputs;
        a first transistor coupled between the input terminal and the first comparator input;
        a second transistor coupled between the current terminal and the first comparator input, the second transistor configured to linearize a first voltage at the first comparator input toward a second voltage at the second comparator input when the current from the inductor is within a threshold range from zero, the second voltage corresponding to an output voltage of the boost converter; and
        a third transistor coupled between the current terminal and the second comparator input;
        in which the comparator is configured to provide the trigger signal based on a comparison between the first voltage and the second voltage.

2. The system of claim 1, wherein the controller is configured to control the boost converter to operate in the first mode or the second mode.

3. The system of claim 1, wherein the first mode is a boost-mode, and the second mode is a down-mode.

4. The system of claim 1, wherein the controller is configured to: enable the high-side switch responsive to a low voltage at the comparator output; and enable the low-side switch responsive to a high voltage at the comparator output.

\* \* \* \* \*